No. 651,143. Patented June 5, 1900.
J. C. KURTZ.
COUPLING FOR CABLE ENDS.
(Application filed Mar. 19, 1900.)
(No Model.)

Witnesses:
Carl J. Noe.
D. K. Allison.

J. C. Kurtz,
Inventor.
By R. J. McCarty
Attorney.

United States Patent Office.

JOHN C. KURTZ, OF DAYTON, OHIO.

COUPLING FOR CABLE ENDS.

SPECIFICATION forming part of Letters Patent No. 651,143, dated June 5, 1900.

Application filed March 19, 1900. Serial No. 9,162. (No model.)

*To all whom it may concern:*

Be it known that I, JOHN C. KURTZ, a citizen of the United States, residing at Dayton, in the county of Montgomery and State of Ohio, have invented a certain new and useful Coupling for Cable Ends; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to means for coupling the ends of cables either in conduits or overhead. The usual way of joining or sleeving the ends of cables consists in connecting the wires, which are insulated from each other, by the use of tape. The joint or bulge thus formed is then coated with paraffin and a lead sleeve placed over it, the ends of which are wiped with solder. In the operation of wiping or soldering the ends of the sleeve the heat incidental thereto compresses the air on the interior of the sleeve, and this frequently causes one or more small pin-holes in the joint, which cannot be detected by the naked eye and which admit air and cause more or less moisture to form on the inside of the sleeve around the joint, and the result is a more or less tendency to leakage of the current and a consequent formation of ground connections. These defects in the forming of a cable-joint require the entire work of wiping a joint to be done over at a considerable expense.

It is therefore the object of the present invention to do away with the lead sleeve, and consequently the necessity of wiping or soldering joints.

In the use of the present device should there be any necessity for disconnecting the cable at any time the same may be done without a waste of any material that was previously used.

Another object of the present invention is to materially decrease the amount of labor incidental to coupling the ends of a cable and also to reduce the expense in comparison with the means heretofore employed.

In a detailed description of my invention reference is made to the accompanying drawings, of which—

Figure 1:
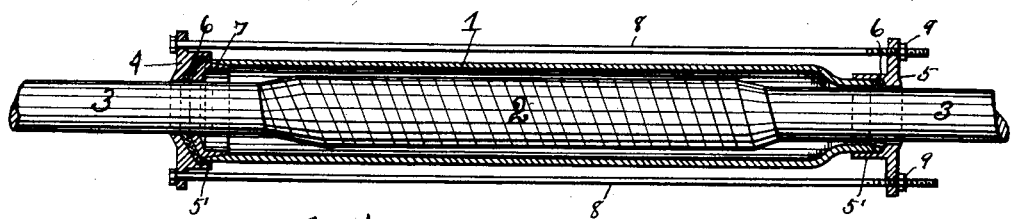
Figure 2:
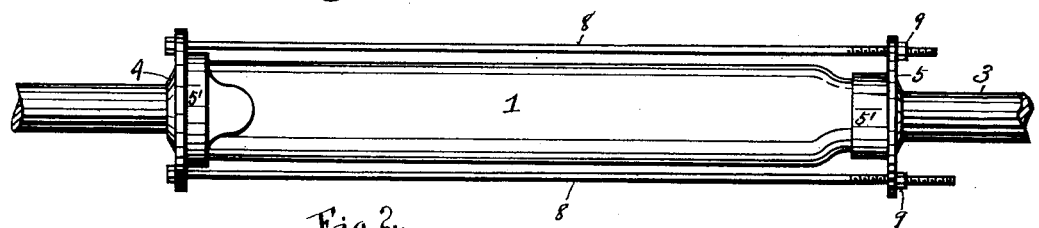
Figure 3:
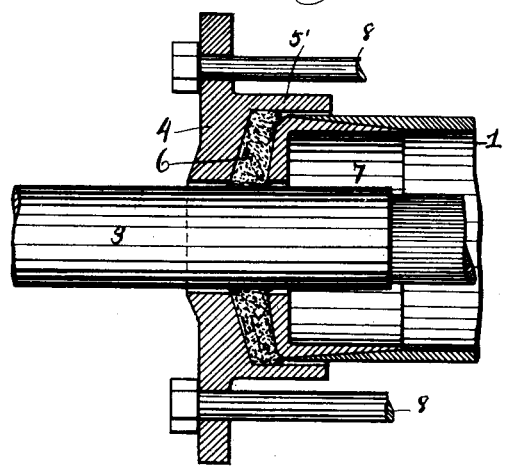
Figure 4:
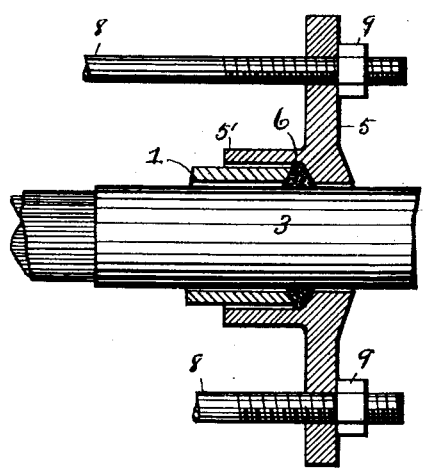
Figure 5:
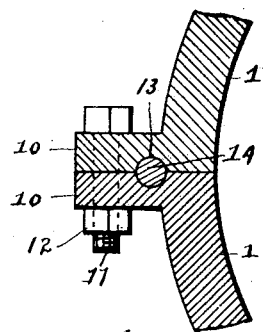

Figure 1 is a longitudinal sectional elevation of my improved coupling. Fig. 2 is a longitudinal side elevation. Figs. 3 and 4, respectively, are enlarged sectional views of the ends of the coupling. Fig. 5 is an enlarged transverse sectional view of a side of the coupling.

1 designates a metallic sleeve which incloses the cable-joint 2. This sleeve at one end is reduced to substantially the diameter of the cable 3. The other end of said sleeve is larger than the bulge or joint 2 in order that the said sleeve may be slipped over the bulge or joint, as is shown in Fig. 1.

4 and 5 are end flanges which have inwardly-projected annular rims 5', which fit over and inclose the ends of the sleeve 1. These flanges have beveled seats in the inner sides which receive elastic gaskets or packing-rings 6 6. The smaller end of the sleeve 1 fits against one of the packing-rings, and a reducing flange or bushing 7 fits against the other of said packing-rings and is inclosed by the larger end of the sleeve 1. The purpose of this reducing flange or bushing 7 is to close the space between the larger end of the sleeve 1 and the cable 3. While I have shown one end of the sleeve 1 reduced in diameter, this is not absolutely necessary. The diameter of the sleeve may be large enough to enable either end to pass over the bulge 2 in the cable; but where both ends of the sleeve are thus provided with the larger diameter it will be understood that two reducing-bushings 7 would have to be used, one at each end.

The elastic packing-rings 6 fit closely around the cable on each side of the joint or bulge 2 and form air-tight connections. Consequently the cable-joint is maintained in a dry condition. The flanges 4 and 5 are provided with openings through which are passed a suitable number of bolts or tightening-rods 8, which are tightened by means of nuts 9 to bring the flanges 4 and 5 and the ends of the sleeve 1 or one end of the sleeve 1 and the bushing 7 in rigid contact with the packing-rings or gaskets 6 6.

For the sake of convenience I have shown in Fig. 5 the sleeve 1 made in two halves, with side flanges 10 extending throughout the length thereof, by means of which the said halves are firmly united by bolts 11 and nuts 12. Throughout these side flanges 10 there are provided longitudinal grooves 13, in which are placed long strips or beads of elastic packing 14, which when the parts of the sleeve are united form air-tight joints along the sides of said sleeve, which prevents the entry of air at these points. This construction is useful in case a leakage or burn-out occurs in the cable. In such event the sleeve may be readily removed and the cable repaired without the necessity of cutting said cable, as in the case of solder joints.

Having described my invention, I claim—

1. A coupling for cable ends consisting of an elongated metallic sleeve, adapted to inclose the connected ends of a cable, end flanges inclosing the ends of said sleeve, said end flanges having seats in their inner sides, elastic gaskets or packing-rings in said seats, the said end flanges and elastic packing-rings being adapted to snugly fit around the cable adjacent to the joint in said cable, and bolts connecting said end flanges and by means of which said flanges are rigidly secured to compress the elastic packing-rings to form air-tight joints at each end of the sleeve.

2. In a coupling for cable ends, the combination of an elongated sleeve, one end of which is reduced in diameter, and the other end of which is of greater diameter than the bulge or joint in the cable, and flanges inclosing the ends of said sleeve, elastic packing-rings inclosed in said end flanges and against one of which one end of the sleeve fits, a reducing-bushing fitting against said elastic packing-rings in the other of said flanges and over which the larger end of the sleeve fits, by means of which the space between the larger end of the sleeve and the cable is closed, and means for tightening said end flanges against said packing-rings, substantially as and for the purposes specified.

In testimony whereof I affix my signature in presence of two witnesses.

JOHN C. KURTZ.

Witnesses:
JOHN W. KALBFUS,
R. J. McCARTY.